United States Patent
Wu (10) Patent No.: US 11,290,939 B2
(45) Date of Patent: Mar. 29, 2022

(54) METHOD AND APPARATUS FOR PROCESSING DATA TRANSMISSION FAILURE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/650,658

(22) PCT Filed: Sep. 17, 2018

(86) PCT No.: PCT/CN2018/106035
§ 371 (c)(1),
(2) Date: Mar. 25, 2020

(87) PCT Pub. No.: WO2019/057012
PCT Pub. Date: Mar. 28, 2019

(65) Prior Publication Data
US 2020/0322864 A1    Oct. 8, 2020

(30) Foreign Application Priority Data
Sep. 25, 2017    (CN) .......................... 201710877187.7

(51) Int. Cl.
*H04W 36/30*        (2009.01)
*H04W 76/19*        (2018.01)
(Continued)

(52) U.S. Cl.
CPC ............. *H04W 36/305* (2018.08); *H04L 1/08* (2013.01); *H04L 41/0668* (2013.01); *H04W 74/0833* (2013.01); *H04W 76/19* (2018.02)

(58) Field of Classification Search
None
See application file for complete search history.

(56) References Cited

U.S. PATENT DOCUMENTS

| 10,757,615 B2 * | 8/2020 | Park .................. H04W 24/10 |
| 2012/0040677 A1 | 2/2012 | Chen |

(Continued)

FOREIGN PATENT DOCUMENTS

| CN | 102347827 A | 2/2012 |
| CN | 102378403 A | 3/2012 |

(Continued)

OTHER PUBLICATIONS

Chinese First Office Action Application No. 201710877187.7; dated Jun. 29, 2020.

(Continued)

*Primary Examiner* — Anh Vu H Ly
(74) *Attorney, Agent, or Firm* — von Briesen & Roper, s.c.

(57) ABSTRACT

A method and an apparatus of processing data transmission failure are provided. The method includes determining a target event occurs, wherein the target event includes one or more of an event that a target RLC entity reaches a maximum number of retransmissions, an event that a physical layer of a target SCell is out of sync, and an event that a random access procedure of the target SCell fails, target RLC entity is in a terminal corresponding to a duplicate bearer, to-be-sent data of target RLC entity is sent only through an SCell, the target SCell is at least one SCell sending to-be-sent data of target RLC entity; resetting target RLC entity, and/or processing target SCell, and/or processing duplicate bearer. The technical solution specifies specific processing of a terminal if the target event occurs, thereby ensuring performance of the terminal and avoiding interference to other terminals.

18 Claims, 5 Drawing Sheets

(51) Int. Cl.
*H04L 1/08* (2006.01)
*H04L 41/0668* (2022.01)
*H04W 74/08* (2009.01)

(56) References Cited

U.S. PATENT DOCUMENTS

2016/0037579 A1    2/2016   Jung et al.
2016/0065700 A1    3/2016   Yi et al.
2020/0037151 A1*   1/2020   Du ............................ H04L 1/22

FOREIGN PATENT DOCUMENTS

CN         104247491 A    12/2014
WO    WO 2014/179982 A1    11/2014

OTHER PUBLICATIONS

European Search Report Application No. 18858284.5; dated Jun. 29, 2020.
Nokia Networks et al.; "SeNB Failure Reporting and Recovery", 3GPP TSG-RAN WG2 Meeting #87, R2-143495, Dresden, Germany, Aug. 18, 2014-Aug. 22, 2014.
Oppo; "RLF on the duplication leg", 3GPP TSG RAN WG2 #99, R2-1707746, Berlin, Germany, Aug. 21, 2017-Aug. 25, 2017.
NTT Docomo, Inc; "New Radio (NR) Access Technology", 3GPP TSG RAN meeting #77, RP-171783, Sapporo, Japan, Sep. 11, 2017-Sep. 14, 2017.

* cited by examiner

METHOD AND APPARATUS FOR PROCESSING DATA TRANSMISSION FAILURE is the U.S. national phase of PCT Application No. PCT/CN2018/106035 filed on Sep. 17, 2018, which claims a priority to Chinese Patent Application No. 201710877187.7 filed on Sep. 25, 2017, the disclosures of which are incorporated in their entirety by reference herein.

TECHNICAL FIELD

The present application relates to the field of communication technology, and, in particular, relates to a method of processing data transmission failure and an apparatus of processing data transmission failure.

BACKGROUND

A 5th-Generation (5G) mobile communication system adopts a Dual Connectivity (DC) architecture, wherein the DC architecture includes two cell groups: a Master Cell Group (MCG) and a Secondary Cell Group (SCG), the MCG corresponds to a Master Node (MN) on a network side, and the SCG corresponds to a Signing Node (SN) on the network side. The network side may configure a plurality of Signaling Radio Bearers (SRBs) for a terminal device, the SRBs includes an SRB1 and an SRB2 configured at the MCG, and an SRB3 configured at the SCG.

Figure 1:
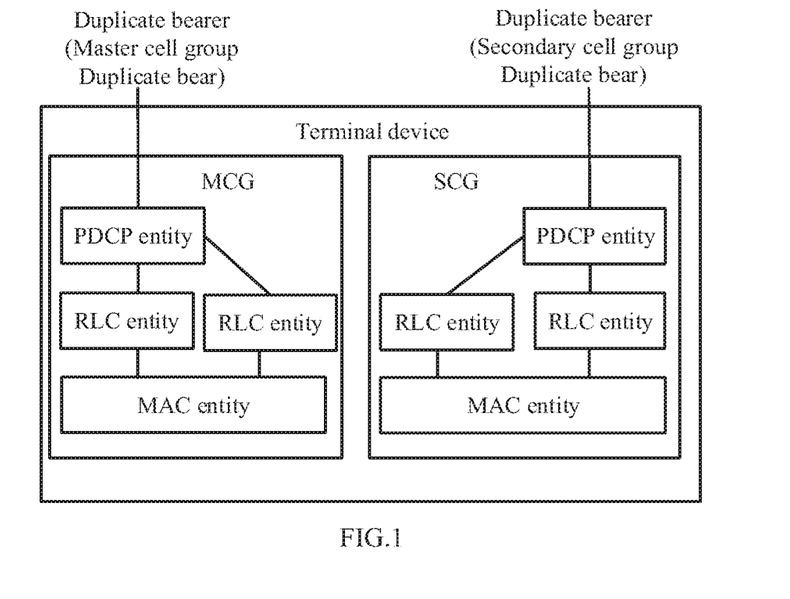
FIG. 1 is a schematic diagram of a Duplicate bearer in a communication system of the present application.
Figure 2:
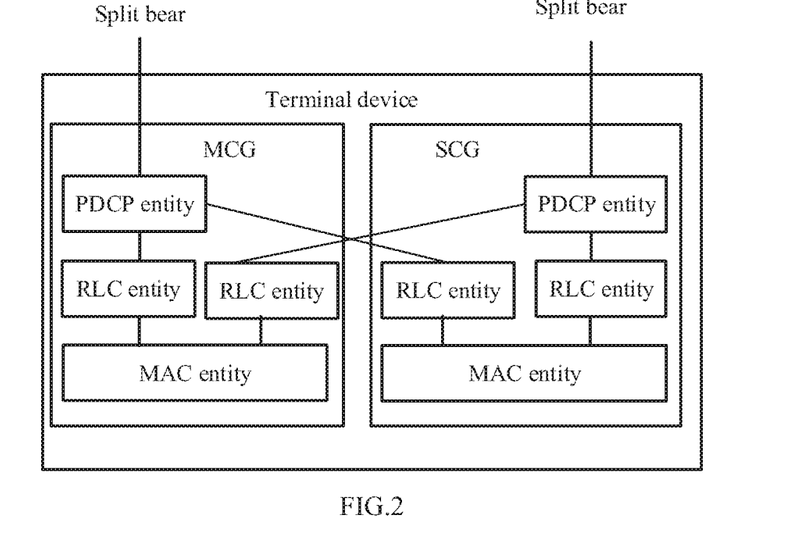
FIG. 2 is a schematic diagram of a Split bearer in a communication system of the present application.

A current 5G mobile communication system includes two bearers supporting a Packet Data Convergence Protocol (PDCP) data Duplicate function, i.e., a Duplicate bear and a Split bear, wherein, as described in FIG. 1, the Duplicate bearer corresponds to one PDCP entity, two Radio Link Control (RLC) entities, and one Medium Access Control (MAC) entity in a cell group in a terminal device; as shown in FIG. 2, the Split bear corresponds to one PDCP entity, two RLC entities (the two RLC entities are in different cell groups) and two MAC entities (the two MAC entities are in different cell groups) in the terminal device. In a case of the Duplicate bear, data from different RLC entities are transmitted through different cells which may be a Secondary Cell (SCell) or a Primary Cell (PCell).

In a case that a certain RLC entity in the terminal device corresponding to the Duplicate bear is configured in such a way that if to-be-sent data of the RLC entity is only sent through the SCell and at least one of the following occurs: the RLC entity reaches the maximum number of retransmissions, and a physical layer of the Scell for sending the to-be-sent data of the RLC entity is out-of-sync and a random access procedure of the SCell fails, SCell failure occurs. However, it is not discussed what kind of operation the terminal device will perform if the SCell failure occurs. Accordingly, it is necessary to propose a method of processing data transmission failure, to provide the operation of the terminal device in case of the SCell failure and to ensure an operational performance of the terminal device and a network equipment.

SUMMARY

An objective of embodiments of the present application is to provide a method and an apparatus of processing data transmission failure, so as to ensure an operational performance of a terminal device and a network device.

In order to solve the above technical problems, the embodiments of the present application are implemented as follow.

In a first aspect, a method of processing a data transmission failure is provided. The method is performed by a terminal device, and includes: determining that a target event occurs, wherein the target event includes at least one of following events: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; performing at least one of following processing operations: resetting the target RLC entity, processing the target SCell, and processing the duplicate bearer.

In a second aspect, an apparatus of processing data transmission failure is provided. The apparatus includes: a first determining unit, used to determine that a target event occurs, wherein the target event includes at least one of following events: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; a processing unit, including at least one of a first processing sub-unit, a second processing sub-unit, and a third processing sub-unit, wherein, the first processing sub-unit is used to reset the target RLC entity, the second processing sub-unit is used to process the target SCell, the third processing sub-unit is used to process the duplicate bearer.

In a third aspect, an electronic device is provided. The electronic device includes: a processor; and a storage storing a computer executable instruction, wherein in a case that the computer executable instruction is executed by a processor, the processor is caused to perform following steps: determining that a target event occurs, wherein the target event includes at least one of following events: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; performing at least one of following processing operations: resetting the target RLC entity, processing the target SCell, and processing the duplicate bearer.

In a fourth aspect, a computer readable storage medium is provided. The computer readable storage medium stores one or more programs, wherein in a case that the one or more programs are executed by an electronic device including a plurality of application programs, the electronic device is caused to perform following steps: determining that a target event occurs, wherein the target event includes at least one of following events: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; performing at least one of following processing operations: resetting the target RLC entity, processing the target SCell, and processing the duplicate bearer.

As can be seen from technical solutions provided in the embodiments of the present application, the embodiments specify that in a case that a target event occurs (i.e., an SCell failure occurs), the terminal device performs processing on the target RLC entity, the target SCell, and the duplicate bearer, thereby ensuring an operational performance of the terminal device and avoiding interference to other terminal devices. In addition, in a case that the target event occurs, the terminal device may also send information relevant to the target event to the network device, so that the network device can accordingly perform subsequent processing on the target event, thereby ensuring an operational performance of the network device.

BRIEF DESCRIPTION OF THE DRAWINGS

In order to more clearly illustrate technical solutions in embodiments of the present application or in the prior art, accompanying drawings to be used in description of the embodiments or in description of the prior art will be briefly described below. It will be apparent that drawings in following description are only some embodiments described in the present application, and those of ordinary skill in the art may also obtain other drawings based on these drawings without paying creative labor.

DETAILED DESCRIPTION

In order for those skilled in the art to better understand the technical solutions in the present application, the technical solutions in some embodiments of the present application will be clearly and completely described below in conjunction with drawings in some embodiments of the present application. The described embodiments are only a part, rather than all, of the embodiments of the present application. Based on the embodiments in the present application, all other embodiments obtained by those of ordinary skills in the art without paying creative labor shall be within the protection scope of the present application.

It should be understood that the technical solutions of the present application can be applied to various communication systems, for example, a GSM (Global System of Mobile Communication), a CDMA (Code Division Multiple Access) system, a WCDMA (Wideband Code Division Multiple Access Wireless) system, a GPRS (General Packet Radio Service) system, a LTE (Long Term Evolution) system, a FDD (Frequency Division Duplex) system, a TDD (Time Division Duplex) system, a UMTS (Universal Mobile Telecommunication System), or a WiMAX (Worldwide Interoperability for Microwave Access) communication system, a Fifth generation (5G) system, or a NR (New Radio) system.

In an embodiment of the present application, the terminal device may include, but is not limit to, a Mobile Station (MS), a Mobile Terminal, a Mobile Telephone, a User Equipment (UE), a handset, a portable equipment, a vehicle, etc., the terminal device may communicate with one or more core networks via a Radio Access Network (RAN). For example, the terminal device may be a mobile telephone (or referred to as a "cellular" phone), a computer or the like having a wireless communication function, the terminal device may also be a portable, pocket-type, hand-held, computer-built or vehicle-mounted mobile apparatus.

A network device mentioned in an embodiment of the present application is an apparatus disposed in a wireless access network and used for providing a wireless communication function for a terminal device. The network device may be a base station, which may include various forms of macro base stations, micro base stations, relay stations, access points, and the like. In systems employing different radio access technologies, a name of an apparatus having a base station function may vary. For example, the name of the apparatus having the base station function is called an evolved Node B (Evolved NodeB, eNB, or eNodeB) in a Long Term Evolution (LTE) network, or is called a Node B in a third-generation (3G) network, and so on.

Figure 3:
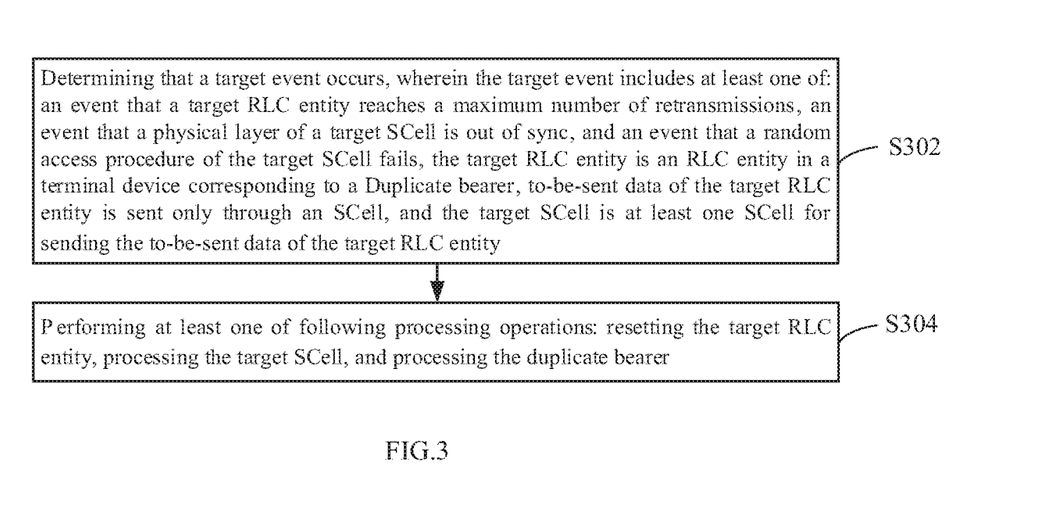
FIG. 3 is a flowchart of a method of processing data transmission failure according to an embodiment of the present application.

FIG. 3 is a flowchart of a method of processing data transmission failure according to an embodiment of the present application. As shown in FIG. 3, the method is executed by a terminal device, and the method may include following steps S302 and S304.

S302: determining that a target event occurs, wherein the target event includes at least one of: an event that a target RLC entity reaches a maximum number of retransmissions, an event that a physical layer of a target SCell is out of sync, and an event that a random access procedure of the target SCell fails, the target RLC entity is an RLC entity in a terminal device corresponding to a Duplicate bearer, to-be-sent data of the target RLC entity is sent only through an SCell, and the target SCell is at least one SCell for sending the to-be-sent data of the target RLC entity.

For ease of understanding, some concepts involved in the embodiments of the present application are first introduced.

In an RLC AM (Acknowledge Mode), a receiving end feeds back, to a sending end, RLC STATUS PDU about whether a data packet (such as one or more RLC PDUs) is received; if the receiving end feeds back that the data packet is not received, then the sending end may retransmit the data packet, and a network side may configure a maximum number of retransmissions of the data packet in an RLC layer.

The Duplicate bear includes a master cell group Duplicate bear and a secondary cell group duplicate bear, wherein, the master cell group duplicate bearer is a Duplicate Bear established between the terminal device and a network device in a master cell group, the secondary cell group duplicate bearer is a Duplicate bearer established between the terminal device and a network device in a secondary cell group.

In an embodiment of the present application, the target RLC entity may be any one or more RLC entities in a terminal device corresponding to the Duplicate bearer, and the to-be-sent data of the target RLC entity may be sent only through a SCell in the master cell group, or may also be sent only through a SCell in the Secondary Cell Group (SCG), wherein the master cell group includes a PCell and at least one SCell, and the secondary cell group includes a PCell and at least one SCell. The target event may also be called a SCell failure.

As an example, in a case that the target RLC entity reaches the maximum number of retransmissions, it is determined that the target event occurs.

As an example, in a case that the physical layer of the target SCell is out of sync, it is determined that a target event occurs.

As an example, in a case that the random access procedure of the target SCell fails, it is determined that the target event occurs.

As an example, in a case that the target RLC entity reaches the maximum number of retransmissions and the random access procedure of the target SCell fails, it is determined that the target event occurs.

As an example, in a case that the target RLC entity reaches the maximum number of retransmissions and the physical layer of the target SCell is out of sync, it is determined that the target event occurs.

As an example, in a case that the random access procedure of the target SCell fails and the physical layer of the target SCell is out of sync, it is determined that the target event occurs.

As an example, in a case that the target RLC entity reaches the maximum number of retransmissions, and the physical layer of the target SCell is out of sync, and the random access procedure of the target SCell fails, it is determined that a target event occurs.

S304: performing at least one of following processing operations: resetting the target RLC entity, processing the target SCell, and processing the duplicate bearer.

In an embodiment, processing the target SCell may include at least one of following processing operations: resetting all RLC entities corresponding to the target SCell; deactivating the target SCell; stopping uplink signal transmission of the target SCell; and stopping downlink signal reception of the target SCell.

In an embodiment, processing the duplicate bearer may include at least one of following processing operations: deactivating a data duplicate function of a PDCP entity in the duplicate bearer, changing a default transmission path of the duplicate bearer as a transmission path corresponding to an other RLC entity; suspending the duplicate bearer, wherein, in a case that the duplicate bearer suspends, the duplicate bearer does not send or receive data; re-establishing a PDCP entity corresponding to the duplicate bearer; and, resetting a Media Access Control (MAC) entity corresponding to the duplicate bearer.

In the embodiment, before changing the default transmission path of the duplicate bearer as the transmission path corresponding to the other RLC entity, the method may further include following steps: determining that the default transmission path of the duplicate bearer is a transmission path corresponding to the target RLC entity.

In the embodiment, before suspending the duplicate bearer, the method further includes following steps: determining that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

In the embodiment, before re-establishing the PDCP entity corresponding to the duplicate bearer, the method may further include a following step: determining that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

In the embodiment, before resetting the media access control (MAC) entity corresponding to the duplicate bearer, the method may further include a following step: determining that at least one of following events occurs in all RLC entities corresponding to the duplicate bearer an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Figure 4:
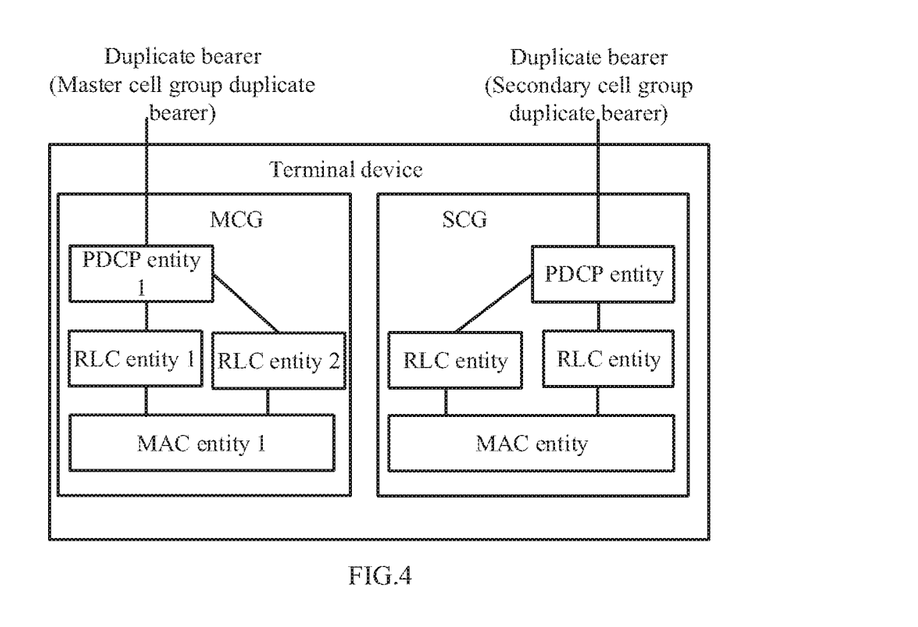
FIG. 4 is a diagram of an example of the method of processing data transmission failure according to an embodiment of the present application.

For ease of understanding, processing operations in S304 described above will be described with reference to an example in the diagram shown in FIG. 4.

For example, an RLC entity 1 in a master cell group duplicate bearer is the target RLC entity. In such a case, the duplicate bearer corresponding to the target RLC entity is the master cell group duplicate bearer, a PDCP entity corresponding to the master cell group duplicate bearer is a PDCP entity 1, a MAC entity corresponding to the master cell group duplicate bearer is an MAC entity 1, and the target SCell is an SCell in the master cell group.

As an example, the RLC entity 1 is reset in a case that a target event occurs. For example, if the RLC entity 1 in the master cell group duplicate bearer reaches the maximum number of retransmissions, then the RLC entity 1 is reset.

As an example, in a case that a target event occurs, all RLC entities in the terminal device corresponding to the target SCell are reset, the target SCell is deactivated, uplink signal transmission of the target SCell is stopped, and downlink signal reception of the target SCell is stopped.

As an example, in a case that a target event occurs, a data duplicate function of the PDCP entity 1 is deactivated, a default transmission path of the master cell group duplicate bearer is changed as a transmission path corresponding to the RLC entity 2, the master cell group duplicate bearer is suspended, the PDCP entity 1 is re-established, and the MAC entity 1 is reset.

As an example, in a case that a target event occurs, it is first determined that at least one of the following events occurs in the RLC entity 2: an event that the RLC entity reaches the maximum number of retransmissions, an event that the physical layer of the SCell for sending the to-be-sent data of the RLC entity is out of sync and an event that the random access procedure of the SCell for sending the to-be-sent data of the RLC entity fails; and then the master cell group duplicate bearer is suspended.

As an example, in a case that a target event occurs, it is first determined that at least one of following events occurs in the RLC entity 2: an event that the RLC entity reaches the maximum number of retransmissions, an event that the physical layer of the SCell for sending the to-be-sent data of the RLC entity is out of sync and an event that the random access procedure of the SCell for sending the to-be-sent data of the RLC entity fails; and then the PDCP entity 1 is re-established.

As an example, in a case that a target event occurs, it is first determined that at least one of following events occurs in the RLC entity 2: an event that the RLC entity reaches the maximum number of retransmissions, an event that the physical layer of the SCell for sending the to-be-sent data of the RLC entity is out of sync and an event that the random access procedure of the SCell for sending the to-be-sent data of the RLC entity fails; and then and the MAC entity 1 is reset.

As can be seen from the above embodiments, the embodiment specifies that in a case that a target event occurs (i.e., an SCell failure occurs), the terminal device performs processing on the target RLC entity, the target SCell, and the duplicate bearer, thereby ensuring an operational performance of the terminal device (e.g., saving power) and avoiding interference to other terminal devices.

Figure 5:
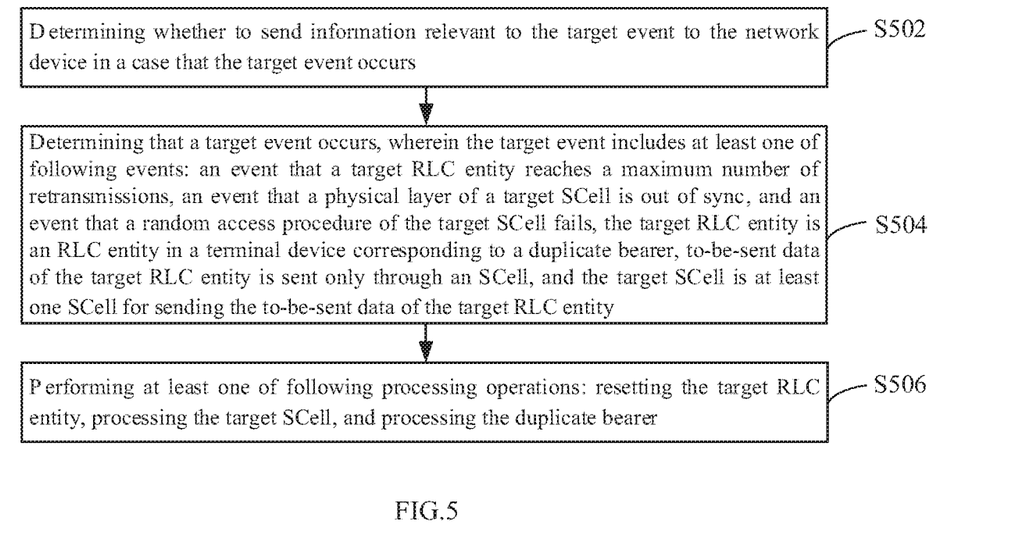
FIG. 5 is a flowchart of a method of processing data transmission failure according to another embodiment of the present application.

FIG. 5 is a flowchart of a method of processing data transmission failure according to an embodiment of the present application. As shown in FIG. 5, the method is executed by a terminal device, and the method may include following steps S502-S506.

S502: determining whether to send information relevant to the target event to the network device in a case that the target event occurs.

In some embodiments of the present application, whether to send information relevant to the target event to the network device in a case that the target event occurs may be specified by a protocol or configuration information.

Optionally, in an embodiment, the above S502 may include: determining, according to a protocol pre-configured in the terminal device, whether to send the information relevant to the target event to the network device in a case that the target event occurs. For example, the protocol is stored in the terminal device before the terminal device is shipped.

Optionally, in another embodiment, the above S502 may include: receiving configuration information sent by a network device, wherein the configuration information is used to indicate whether to send the information relevant to the target event to the network device in a case that the target event occurs; determining, based on the configuration information, whether to send the information relevant to the target event to the network device in a case that the target event occurs, wherein the network device may include a Master Node (MN) corresponding to a Master Cell Group (MCG), and/or a Secondary Node (SN) corresponding to a Secondary Cell Group (SCG).

As an example, the terminal device receives the configuration information sent by the master node corresponding to the master cell group, and determines, based on the configuration information sent by the master node, whether to send the information relevant to the target event to the master node in a case that the target event occurs.

As an example, the terminal device receives the configuration information sent by the master node corresponding to the master cell group, and determines, based on the configuration information sent by the master node, whether to send the information relevant to the target event to the secondary node corresponding to the secondary cell group in a case that the target event occurs.

As an example, the terminal device receives the configuration information sent by the secondary node corresponding to the secondary cell group, and determines, based on the configuration information sent by the secondary node, whether to send the information relevant to the target event to the secondary node in a case that the target event occurs.

As an example, the terminal device receives the configuration information sent by the secondary node corresponding to the secondary cell group, and determines, based on the configuration information sent by the secondary node, whether to send the information relevant to the target event to the master node corresponding to the master cell group in a case that the target event occurs.

In an embodiment of that present application, the information relevant to the target event includes any combination of one or more of following: an identifier of the target SCell; an identifier of a cell group to which the target SCell belong; an identifier of a duplicate bearer corresponding to the target RLC entity; an identifier of a target RLC entity; an identifier of a logical channel corresponding to the target RLC entity; an identifier of a logical channel group to which the logical channel corresponding to the target RLC entity belongs; a measurement result of a cell corresponding to the target RLC entity; a measurement result of a beam of the cell corresponding to the target RLC entity; a measurement result of a serving cell; a measurement result of a beam of the serving cell, wherein a serving frequency corresponds to a plurality of serving cells and a plurality of non-serving cells, a serving cell may include a plurality of cell groups, and a cell group may include a plurality of cells; a measurement result of cells of a serving frequency; a measurement result of beams of cells of a serving frequency; a measurement result of a serving cell in which a cell group to which the target SCell belongs is; a measurement result of a beam of a serving cell in which a cell group to which the target SCell belongs is; a measurement result of a cell corresponding to a serving frequency to which the target SCell belongs; a measurement result of a beam of a cell corresponding to a serving frequency to which the target SCell belongs; a measurement result of a cell corresponding to a non-serving frequency; and, a measurement result of a beam of a cell corresponding to a non-serving frequency.

As an example, the measurement result of the cell corresponding to the target RLC entity may include a Reference Signal Reception Power (RSRP) and/or a Reference Signal Reception Quality (RSRQ) of the cell corresponding to the target RLC entity.

As an example, the measurement result of the beam of the cell corresponding to the target RLC entity may include the RSRP and/or the RSRQ of the beam of the cell corresponding to the target RLC entity.

As an example, the measurement result of the serving cell may include the RSRP and/or the RSRQ of the serving cell.

As an example, the measurement result of the beam of the serving cell may include the RSRP and/or the RSRQ of the beam of the serving cell.

As an example, the measurement result of the cell corresponding to the serving frequency may include the RSRP and/or the RSRQ of the cell corresponding to the serving frequency.

As an example, the measurement result of the beam of the cell corresponding to the serving frequency may include the RSRP and/or the RSRQ of the beam of the cell of the serving frequency.

As an example, the measurement result of the serving cell in which the cell group to which the target SCell belongs is in may include the RSRP and/or the RSRQ of the serving cell in which the cell group to which the target SCell belongs is.

As an example, the measurement result of the beam of the serving cell in which the cell group to which the target SCell belongs is may include the RSRP and/or the RSRQ of the beam of the serving cell in which the cell group to which the target SCell belongs is.

As an example, the measurement result of the cells of the serving frequency to which the target SCell belongs may include the RSRP and/or the RSRQ of the cells of the serving frequency to which the target SCell belongs.

As an example, the measurement result of the beams of the cells of the serving frequency to which the target SCell belongs may include the RSRP and/or the RSRQ of the beams of the cells of the serving frequency to which the target SCell belongs.

As an example, the measurement result of the cell of the non-serving frequency may include the RSRP and/or the RSRQ of the cell of the non-serving frequency.

As an example, the measurement result of the beam of the cell of the non-serving frequency may include the RSRP and/or the RSRQ of the beam of the cell of the non-serving frequency.

S504: determining that a target event occurs, wherein the target event includes at least one of following events: an event that a target RLC entity reaches a maximum number of retransmissions, an event that a physical layer of a target SCell is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity.

S506: performing at least one of following processing operations: resetting the target RLC entity, processing the target SCell, and processing the duplicate bearer.

Contents of S504 and S506 in the embodiment of the present application are similar to contents of S302 and S304 in the embodiment shown in FIG. 3, and will not be repeated here. Details thereof may be seen from the contents of S302 and S304 in the embodiment shown in FIG. 3.

As can be seen from the above embodiments, the embodiment specifies that in a case that a target event occurs (i.e., an SCell failure occurs), the terminal device performs processing on the target RLC entity, the target SCell, and the duplicate bearer, thereby ensuring an operational performance of the terminal device and avoiding interference to other terminal devices. In addition, the configuration information sent by the network device or the protocol may also stipulate whether the terminal device sends the information relevant to the target event to the network device in a case that the target event occurs, so that in a case that the target event occurs, the terminal device may also send information relevant to the target event to the network device, and the network device can accordingly perform subsequent processing on the target event, thereby ensuring an operational performance of the network device.

It should be noted that in addition to an execution order in the embodiment shown in FIG. 5, the step of "determining whether to send the information relevant to the target event to the network device in a case that the target event" may also be performed after the step of "determining that the target event occurs", or may also be performed after "performing at least one of following processing operations: resetting the target RLC entity, processing the target SCell, and processing the duplicate bearer", the embodiments of the present application are not limited thereto.

Figure 6:
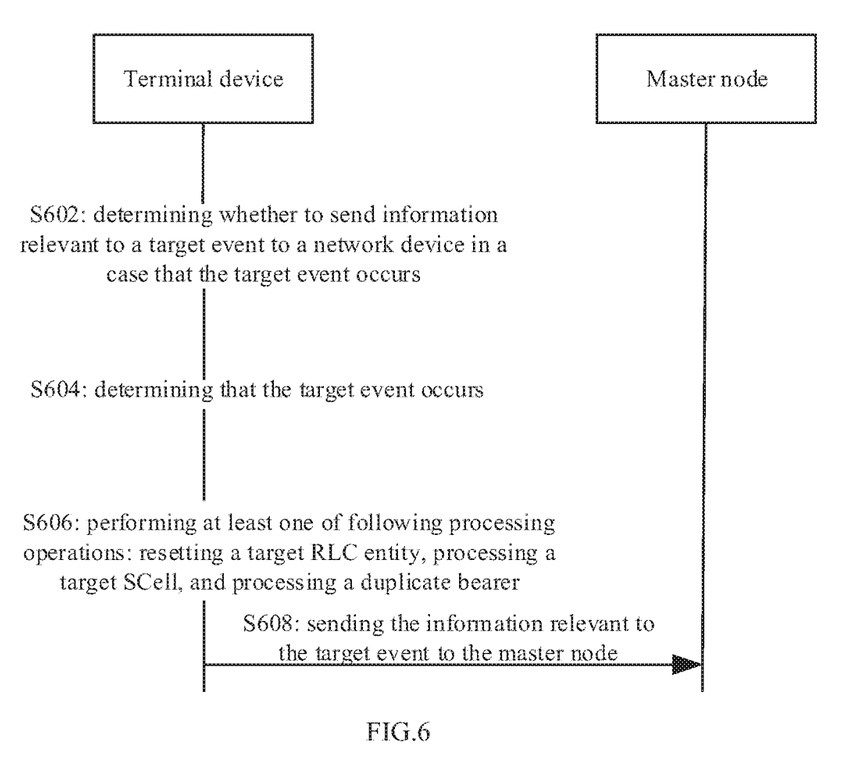
FIG. 6 is an interaction flow diagram of the method of processing data transmission failure according to an embodiment of the present application.

In another embodiment provided by the present application, in a case that the target SCell is an SCell in the master cell group, as shown in FIG. 6, an interaction procedure between the terminal device and a master node (also referred to as a master base station) corresponding to the master cell group includes following steps S602-S608.

S602: determining whether to send the information relevant to the target event to the network device in a case that the target event occurs.

In the embodiment of the present application, the terminal device may determine, according to a protocol, whether to send the information relevant to the target event to the master node in a case that the target event occurs; optionally, the terminal device may also determine, by receiving the configuration information sent by the master node in the master cell group, whether to send the information relevant to the target event to the master node in a case that the target event occurs; specifically, the master node sends the configuration information through an RRC Connection Reconfiguration procedure.

S604: determining that the target event occurs.

S606: performing at least one of following processing operations: resetting the target RLC entity, processing the target SCell, and processing the duplicate bearer.

S608: sending the information relevant to the target event to the master node.

In the embodiment of the present application, in a case that it is determined that a target event occurs, the terminal device may send the information relevant to the target event to the master node corresponding to the master cell group through a signaling radio bearer SRB1 or SRB2.

As an example, in a case that it is determined that a target event occurs, the terminal device may send the information relevant to the target event to the master node corresponding to the master cell group through the signaling radio bearer SRB1.

As an example, in a case that it is determined that a target event occurs, the terminal device may send the information relevant to the target event to the master node corresponding to the master cell group through the signaling radio bearer SRB2.

Figure 7:
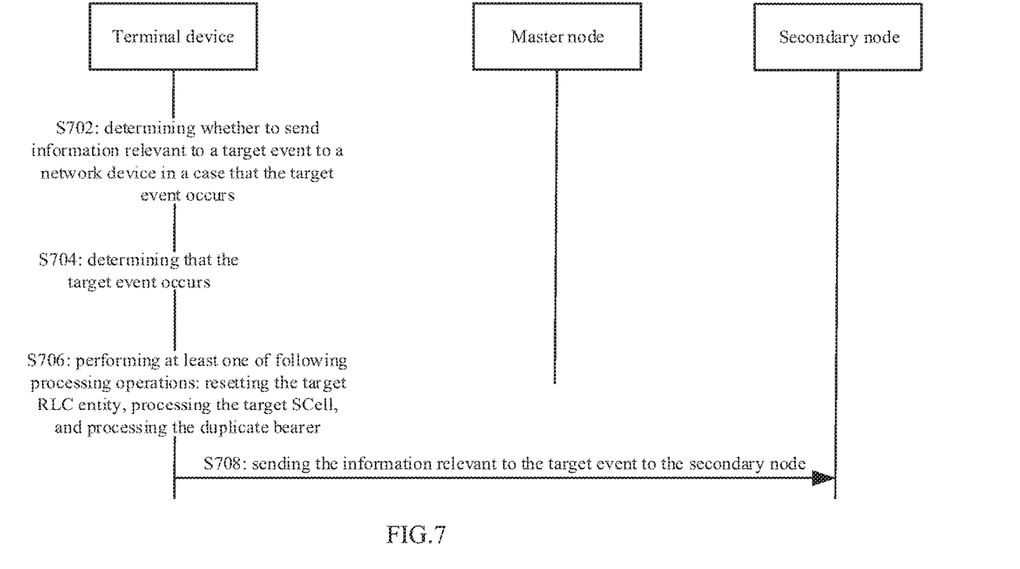
FIG. 7 is an interaction flow diagram of the method of processing data transmission failure according to another embodiment of the present application.

In another embodiment provided by the present application, in a case that the target SCell is a SCell in the secondary cell group, as shown in FIG. 7, an interaction procedure among the terminal device, the master node corresponding to the master cell group, and the secondary node corresponding to the secondary cell group includes following steps S702-S708.

S702: determining whether to send information relevant to the target event to the network device in a case that the target event occurs.

In the embodiment of the present application, the terminal device may determine, according to a protocol, whether to send the information relevant to the target event to the secondary node in a case that the target event occurs;

optionally, the terminal device may also determine, by receiving the configuration information sent by the master node in the master cell group, whether to send the information relevant to the target event to the secondary node in a case that the target event occurs, specifically, the master node sends the configuration information through an RRC Connection Reconfiguration procedure; optionally, the terminal device may determine, by receiving configuration information sent by the secondary node in the secondary cell group, whether to send the information relevant to the target event to the secondary node in a case that the target event occurs, specifically, the secondary node sends the configuration information through an RRC Connection Reconfiguration procedure.

S704: determining that the target event occurs.

S706: performing at least one of following processing operations: resetting the target RLC entity, processing the target SCell, and processing the duplicate bearer.

S708: sending the information relevant to the target event to the secondary node.

In the embodiment of the present application, in a case that it is determined that a target event occurs, the terminal device may send the information relevant to the target event to the secondary node corresponding to the secondary cell group through a signaling radio bearer SRB3.

Figure 8:
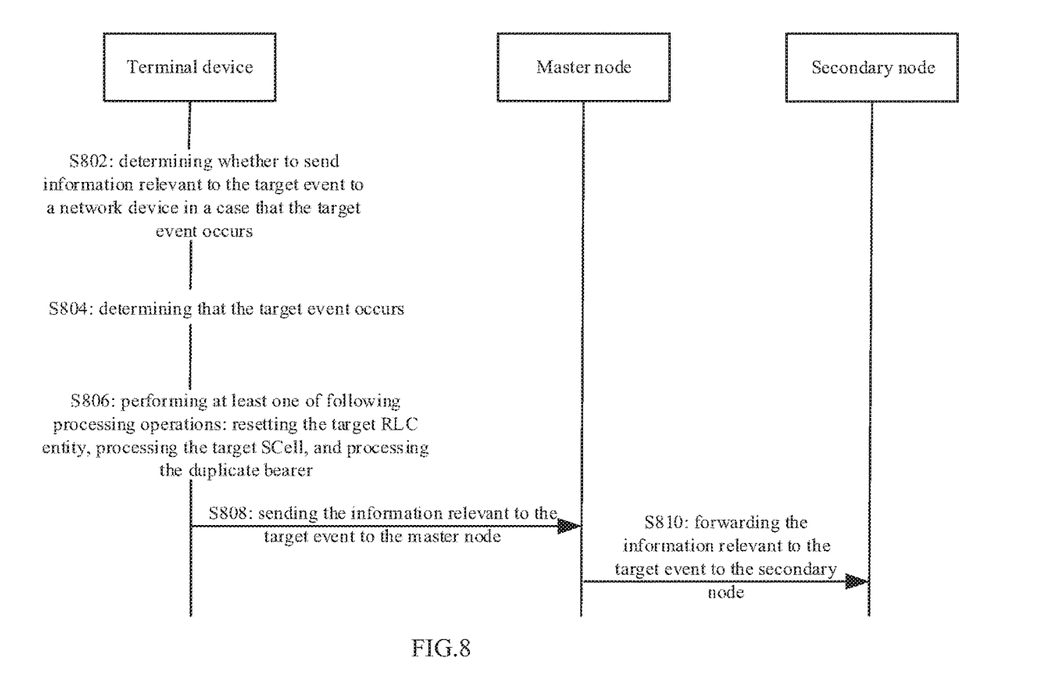
FIG. 8 is an interaction flow diagram of the method of processing data transmission failure according to another embodiment of the present application.

In another embodiment provided by the present application, in a case that the target SCell is a SCell in the SCG, as shown in FIG. 8, an interaction procedure among the terminal device, the master node corresponding to the master cell group, and the secondary node corresponding to the secondary cell group includes following steps S802-S810, wherein, the terminal device performs the steps S802-S808, and the master node performs the step S810.

S802: determining whether to send information relevant to the target event to a network device in a case that the target event occurs.

In the embodiment of the present application, the terminal device may determine, according to a protocol, whether to send the information relevant to the target event to the secondary node in a case that the target event occurs; optionally, the terminal device may determine, by receiving the configuration information sent by the master node in the master cell group, whether to send the information relevant to the target event to the secondary node in a case that the target event occurs, specifically, the master node sends the configuration information through an RRC Connection Reconfiguration procedure; optionally, the terminal device may determine, by receiving configuration information sent by the secondary node in the secondary cell group, whether to send the information relevant to the target event to the secondary node in a case that the target event occurs, specifically, the secondary node sends the configuration information through an RRC Connection Reconfiguration procedure.

S804: determining that the target event occurs.

S806: performing at least one of following processing operations: resetting the target RLC entity, processing the target SCell, and processing the duplicate bearer.

S808: sending the information relevant to the target event to the master node.

S810: forwarding the information relevant to the target event to the secondary node.

In the embodiment of the present application, in a case that it is determined that a target event occurs, the terminal device may send the information relevant to the target event to the master node corresponding to the master cell group through a signaling radio bearer SRB1 or SRB2, and the master node then forwards the information relevant to the target event to the secondary node.

It should be noted that a procedure for processing the target RLC entity, the target SCell, and the duplicate bearer in the embodiments shown in FIGS. 6 to 8 is similar to a processing procedure in the embodiment shown in FIG. 3, and the contents of the information relevant to the target event in the embodiments shown in FIGS. 6 to 8 are similar to the contents of the information relevant to the target event in the embodiment shown in FIG. 5 and are not repeated herein. Details of the contents may be obtained by referring to contents in the embodiments shown in FIGS. 3-5.

Specific embodiments of the present application have been described above. Other embodiments are within the scope of the appended claims. In some cases, actions or steps recited in the claims may be performed in an order other than that in the embodiments, but desired results still may be achieved. In addition, a process depicted in the drawings achieves the desired results without necessitating the shown particular order or a sequential order. In some embodiments, multi-task processing and parallel processing are also possible or may be advantageous.

Figure 9:
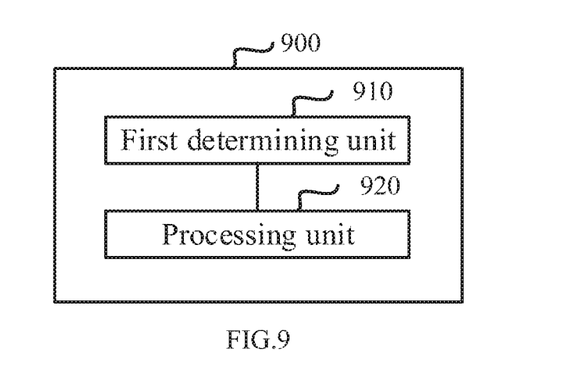
FIG. 9 is a schematic structural diagram of an apparatus of processing data transmission failure according to an embodiment of the present application.

FIG. 9 is a schematic structural diagram of an apparatus of processing data transmission failure according to an embodiment of the present application. As shown in FIG. 9, an apparatus 900 of processing data transmission failure may include a first determining unit 910 and a processing unit 920, wherein, the first determining unit 910 is used to determine that a target event occurs, wherein the target event includes at least one of following events: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity. The processing unit 920 includes at least one of a first processing sub-unit, a second processing sub-unit, and a third processing sub-unit, wherein the first processing sub-unit is used to reset the target RLC entity, the second processing sub-unit is used to process the target SCell, and the third processing sub-unit is used to process the duplicate bearer.

As can be seen from the above embodiment, the embodiment specifies that in a case that a target event (i.e., SCell failure) occurs, the terminal device processes the target RLC entity, the target SCell, and the duplicate bearer, thereby ensuring an operational performance of the terminal device and avoiding interference to other terminal device.

Optionally, as an embodiment, the apparatus 900 of processing data transmission failure may further include: a second determining unit used to determine whether to send information relevant to the target event to a network device in a case that the target event occurs.

Optionally, as an embodiment, the second processing sub-unit is specifically used to perform at least one of following processing operations: resetting all RLC entities corresponding to the target SCell, deactivating the target SCell, stopping uplink signal transmission of the target SCell, and stopping downlink signal reception of the target SCell.

Optionally, as an embodiment, the third processing sub-unit is specifically used to perform at least one of following processing operations: deactivating a data duplicate function of a Packet Data Convergence Protocol (PDCP) entity corresponding to the duplicate bearer; changing a default transmission path of the duplicate bearer as a transmission path corresponding to an other RLC entity; suspending the duplicate bearer, wherein, in a case that the duplicate bearer is suspended, the duplicate bearer does not send or receive data; re-establishing a PDCP entity corresponding to the duplicate bearer; and, resetting a Media Access Control (MAC) entity corresponding to the duplicate bearer.

Optionally, as an embodiment, the third processing sub-unit is further used to determine that the default transmission path of the duplicate bearer is a transmission path corresponding to the target RLC entity.

Optionally, as an embodiment, the third processing sub-unit is further used to, before suspending the duplicate bearer, determine that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Optionally, as an embodiment, the third processing sub-unit is further used to, before re-establishing the PDCP entity corresponding to the duplicate bearer, determine that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Optionally, as an embodiment, the third processing sub-unit is further used to, before resetting the media access control (MAC) entity corresponding to the duplicate bearer, determine that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Optionally, as an embodiment, the second determining unit includes a first determining sub-unit used to determine, according to a protocol pre-configured in the terminal device, whether to send information relevant to the target event to the network device in a case that the target event occurs.

Optionally, as an embodiment, the second determining unit includes a second determining sub-unit used to receive configuration information sent by a network device, wherein the configuration information is used to indicate whether to send the information relevant to the target event to the network device in a case that the target event occurs; determine, based on the configuration information, whether to send the information relevant to the target event to the network device in a case that the target event occurs.

Optionally, as an embodiment, the network device include a Master Node (MN) corresponding to a Master Cell Group (MCG), and/or a Secondary Node (SN) corresponding to a Secondary Cell Group (SCG).

Optionally, as an embodiment, the target SCell is an SCell in the MCG; the apparatus further includes a first sending unit used to send, in a case that the target event occurs, the information relevant to the target event to the MN corresponding to the MCG through a signaling radio bearer SRB1 or SRB2.

Optionally, as an embodiment, the target SCell is an SCell in the SCG; the apparatus further includes a second sending unit used to send, in a case that the target event occurs, the information relevant to the target event to the SN corresponding to the SCG through a signaling radio bearer SRB3.

Optionally, as an embodiment, the target SCell is an SCell in the SCG; the apparatus further includes a third sending unit used to send, in a case that the target event occurs, send the information relevant to the target event to the MN corresponding to the MCG through a signaling radio bearer SRB1 or SRB2, wherein the MN is used to forward the information relevant to the target event to the SN corresponding to the SCG.

Optionally, as an embodiment, the information relevant to the target event includes any combination of one or more of the following: an identifier of the target SCell; an identifier of a cell group to which the target SCell belong; an identifier of a duplicate bearer corresponding to the target RLC entity; an identifier of a target RLC entity; an identifier of a logical channel corresponding to the target RLC entity; an identifier of a logical channel group to which the logical channel corresponding to the target RLC entity belongs; a measurement result of a cell corresponding to the target RLC entity; a measurement result of a beam of the cell corresponding to the target RLC entity; a measurement result of a serving cell; a measurement result of a beam of the serving cell; a measurement result of cells of a serving frequency; a measurement result of beams of cells of a serving frequency; a measurement result of a serving cell in which a cell group to which the target SCell belongs is; a measurement result of a beam of a serving cell in which a cell group to which the target SCell belongs is; a measurement result of a cell corresponding to a serving frequency to which the target SCell belongs; a measurement result of a beam of a cell corresponding to a serving frequency to which the target SCell belongs; a measurement result of a cell corresponding to a non-serving frequency; and, a measurement result of a beam of a cell corresponding to a non-serving frequency.

Figure 10:
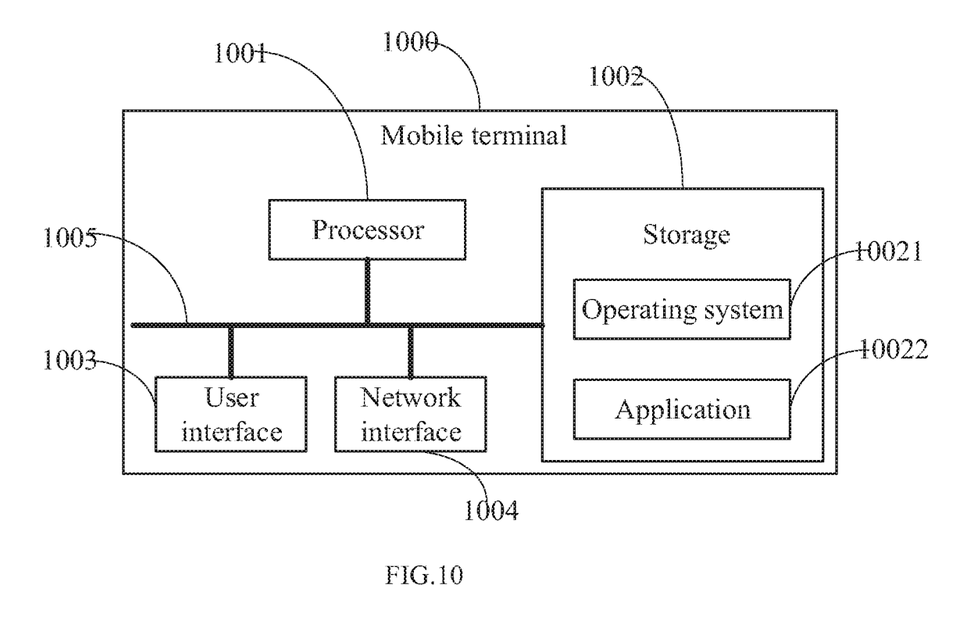
FIG. 10 is a schematic structural diagram of an electronic device according to an embodiment of the present application.

FIG. 10 is a schematic structural diagram of an electronic device according to an embodiment of the present application. The electronic device 1000 shown in FIG. 10 includes at least one processor 1001, a storage 1002, at least one network interface 1004, and a user interface 1003. Various components in the electronic device 1000 are coupled together by a bus system 1005. It will be appreciated that bus system 1005 is used to enable connection communication among these components. The bus system 1005 includes a data bus, a power bus, a control bus, and a status signal bus. For the sake of clarity, however, various buses in FIG. 10 are labeled as the bus system 1005 in FIG. 10.

Here, the user interface 1003 may include a display, a keyboard or a pointing device (e.g., a mouse, a trackball, a touch pad or a touch screen, etc.).

It will be appreciated that the storage 1002 in the embodiments of the present application may be a volatile storage or a non-volatile storage, or may include both a volatile storage and a non-volatile storage. Here, the non-volatile storage may be a Read-Only Memory (ROM), a Programmable ROM (PROM), an Erasable PROM (EPROM), an Electrically EPROM (EEPROM), or a flash memory. The volatile storage may be a Random Access Memory (RAM), which serves as an external cache. By way of example but not limitation, many forms of RAM are available, such as a Static RAM (SRAM), a Dynamic RAM (DRAM), a Synchronous DRAM (SDRAM), a DoubleDataRate SDRAM (DDRSDRAM), an Enhanced SDRAM (ESDRAM), a Synchlink DRAM (SLDRAM) and a DirectRambusRAM (DR- RAM). The storage 1002 of the system and the method described by the embodiments of the present application is intended to include, but is not limited to, these and any other suitable types of storages.

In some embodiments, the storage 1002 stores following elements, executable modules or data structures, or a subset thereof, or an extended set thereof: an operating system 10021 and an application 10022.

The operating system 10021 includes various system programs, such as a frame layer, a core library layer, a driver layer, and the like, for implementing various basic services and processing hardware-based tasks. The application 10022 includes various applications, such as a Media Player, a Browser, and the like, for implementing various application services. Programs for implementing the methods of embodiments of the present application may be included in the application 10022.

In an embodiment of that present application, the terminal device 1000 further include a computer program stored on the storage 1002 and executable by the processor 1001, wherein when the computer program is executed by the processor 1001, the processor 1001 implements following steps: determining that a target event occurs, wherein the target event includes at least one of: an event that a target Radio Link Control (RLC) entity reaches a maximum number of retransmissions, an event that a physical layer of a target Secondary Cell (SCell) is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; performing at least one of following processing operations: resetting the target RLC entity, processing the target SCell, and processing the duplicate bearer.

The method disclosed in the embodiments of the present application described above may be applied in or implemented by the processor 1001. The processor 1001 may be an integrated circuit chip having a signal processing capability. In an implementation process, the steps of the above-described method may be performed by an integrated logic circuit of hardware in the processor 1001 or by an instruction in a form of software. The processor 1001 described above may be a general purpose processor, a Digital Signal Processor (DSP), an Application Specific Integrated Circuit (ASIC), a Field Programmable Gate Array (FPGA) or other programmable logic device, a discrete gate or a transistor logic device, a discrete hardware component. The methods, steps, and logical block diagrams disclosed in embodiments of the present application may be implemented or performed. A general purpose processor may be a microprocessor or the processor may also be any conventional processor or the like. The steps of the method disclosed in connection with embodiments of the present application may be embodied directly to be executed by a hardware decoding processor or in a combination of hardware and software modules in the decoding processor. Software modules may be located in computer readable storage media mature in the art such as the random access memory, the flash memory, the read only memory, the programmable read only memory, or the electrically erasable programmable memory, a register, etc. The computer readable storage medium is located in the storage 1002, the processor 1001 reads information in the storage 1002, and performs the steps of the above method in conjunction with hardware of the processor 1001. Specifically, a computer program is stored on the computer readable storage medium, and in a case that the computer program is executed by the processor 1001, the processor 1001 implements the steps of the method of processing data transmission fails in the embodiments as described.

It will be appreciated that the embodiments described herein may be implemented in hardware, software, firmware, middleware, microcode, or a combination thereof. For hardware implementation, the processing unit may be implemented in one or more Application Specific Integrated Circuits (ASICs), a Digital Signal Processor (DSP), a Digital Signal Processing Device (DSPD), a Programmable Logic Device (PLD), a Field-Programmable Gate Array (FPGA), a General-Purpose processor, a controller, a microcontroller, a microprocessor, other electronic unit for performing functions described herein, or a combination thereof.

For software implementation, techniques described in the embodiments of the present application may be implemented by means of modules (e.g., processes, functions, etc.) that perform the functions described in embodiments of the present application. A software code may be stored in a storage and executed by a processor. The storage may be implemented in a processor or external to a processor.

In addition, in a case that the computer program is executed by the processor 1001, the processor 1001 implements following steps: determining whether to send information relevant to the target event to the network device in a case that the target event occurs.

Optionally, processing the target SCell includes at least one of following processing operations: resetting all RLC entities corresponding to the target SCell; deactivating the target SCell; stopping uplink signal transmission of the target SCell; and stopping downlink signal reception of the target SCell.

Optionally, processing the duplicate bearer includes at least one of following processing operations: deactivating a data duplicate function of a Packet Data Convergence Protocol (PDCP) entity corresponding to the duplicate bearer; changing a default transmission path of the duplicate bearer as a transmission path corresponding to an other RLC entity; suspending the duplicate bearer, wherein, in a case that the duplicate bearer is suspended, the duplicate bearer does not send or receive data; re-establishing a PDCP entity corresponding to the duplicate bearer; and, resetting a Media Access Control (MAC) entity corresponding to the duplicate bearer.

Optionally, before changing the default transmission path of the duplicate bearer as the transmission path corresponding to the other RLC entity, the processor further implements a following step: determining that the default transmission path of the duplicate bearer is a transmission path corresponding to the target RLC entity.

Optionally, before suspending the duplicate bearer, the processor further implements following steps: determining that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Optionally, before re-establishing the PDCP entity corresponding to the duplicate bearer, the processor further implements a following step: determining that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync, and an event that the random access procedure of the SCell for sending the to-be-sent data of the RLC entity fails.

Optionally, before resetting the media access control (MAC) entity corresponding to the duplicate bearer, the processor further implements a following step: determining that at least one of following events occurs in all RLC entities corresponding to the duplicate bearer: an event that the RLC entity reaches the maximum number of retransmissions, an event that the physical layer of the SCell for sending the to-be-sent data of the RLC entity is out of sync and the random access procedure of the SCell for sending the to-be-sent data of the RLC entity fails.

Optionally, determining whether to send the information relevant to the target event to the network device in a case that the target event occurs includes: determining, according to a protocol pre-configured in the terminal device, whether to send the information relevant to the target event to the network device in a case that the target event occurs.

Optionally, determining whether to send the information relevant to the target event to the network device in a case that the target event occurs includes: receiving configuration information sent by a network device, wherein the configuration information is used to indicate whether to send the information relevant to the target event to the network device in a case that the target event occurs; determining, based on the configuration information, whether to send the information relevant to the target event to the network device in a case that the target event occurs.

Optionally, the network device includes a Master Node (MN) corresponding to a Master Cell Group (MCG), and/or a Secondary Node (SN) corresponding to a Secondary Cell Group (SCG).

Optionally, the target SCell is an SCell in the MCG; the processor further implements: in a case that the target event occurs, sending the information relevant to the target event to the MN corresponding to the MCG through a signaling radio bearer SRB1 or SRB2.

Optionally, the target SCell is an SCell in the SCG; the processor further implements: in a case that the target event occurs, sending the information relevant to the target event to the SN corresponding to the SCG through a signaling radio bearer SRB3

Optionally, the target SCell is an SCell in the SCG; the processor further implements: in a case that the target event occurs, sending the information relevant to the target event to the MN corresponding to the MCG through a signaling radio bearer SRB1 or SRB2, wherein the MN is used to forward the information relevant to the target event to the SN corresponding to the SCG.

Optionally, the information relevant to the target event includes any combination of one or more of following: an identifier of the target SCell; an identifier of a cell group to which the target SCell belong; an identifier of a duplicate bearer corresponding to the target RLC entity; an identifier of a target RLC entity; an identifier of a logical channel corresponding to the target RLC entity; an identifier of a logical channel group to which the logical channel corresponding to the target RLC entity belongs; a measurement result of a cell corresponding to the target RLC entity; a measurement result of a beam of the cell corresponding to the target RLC entity; a measurement result of a serving cell; a measurement result of a beam of the serving cell; a measurement result of cells of a serving frequency; a measurement result of beams of cells of a serving frequency; a measurement result of a serving cell in which a cell group to which the target SCell belongs is; a measurement result of a beam of a serving cell in which a cell group to which the target SCell belongs is; a measurement result of a cell corresponding to a serving frequency to which the target SCell belongs; a measurement result of a beam of a cell corresponding to a serving frequency to which the target SCell belongs; a measurement result of a cell corresponding to a non-serving frequency; and, a measurement result of a beam of a cell corresponding to a non-serving frequency.

The terminal device 1000 can realize various processes realized by the terminal device in the foregoing embodiments, and is not described here again in order to avoid repetition.

The embodiments of the present application also provide a computer readable storage medium that stores one or more programs, the one or more programs include instructions. In a case that the instructions are executed by a portable electronic device including a plurality of application programs, the portable electronic device can be caused to perform the method of the embodiment shown in FIG. 1, and is specifically used to perform following operations: determining that a target event occurs, wherein the target event includes at least one of: an event that a target Radio Link Control (RLC) entity reaches a maximum number of retransmissions, an event that a physical layer of a target SCell is out of sync, and an event that a random access procedure of the target SCell fails, the target RLC entity is an RLC entity in a terminal device corresponding to a duplicate bearer, to-be-sent data of the target RLC entity is sent only through an SCell, and the target SCell is at least one SCell for sending the to-be-sent data of the target RLC entity; performing at least one of following processing operations: resetting the target RLC entity, processing the target SCell, and processing the duplicate bearer.

In summary, the above described embodiments are only preferred embodiments of the present application and are not intended to limit the protection scope of the present application. Any modification, equivalent substitution, improvement, etc. made within the spirit and the principle of the present application shall be included within the protection scope of the present application.

Systems, apparatuses, modules or units set forth in the above embodiments may in particular be implemented by computer chips or entities, or by products having certain functions. A typical implementation of the apparatus is a computer. In particular, the computer may be, for example, a personal computer, a laptop computer, a cellular phone, a camera phone, a smart phone, a personal digital assistant, a media player, a navigation apparatus, an email apparatus, a game console, a tablet computer, a wearable apparatus or a combination of any of the above apparatuses Computer readable media include a permanent computer readable medium and a non-permanent computer readable medium, a removable medium and a non-removable medium, and may be implemented for storing information by using any method or technique. The information may be computer readable instructions, data structures, modules of programs, or other data. Examples of computer storage media include, but are not limited to, a Phase Change Memory (PRAM), a Static Random Access Memory (SRAM), a Dynamic Random Access Memory (DRAM), other types of Random Access Memory (RAM), a Read Only Memory (ROM), an Electrically Erasable Programmable Read Only Memory (EEPROM), a flash memory or other memory technology, a read only CD-ROM (CD-ROM), a Digital Versatile Disc (DVD) or other optical storage, a cassette magnetic tape, a magnetic tape disk storage or other magnetic storage apparatus or any other non-transmission medium that can be used to store information accessible by a computing device. As defined herein, a computer readable medium do not include a transitory computer readable medium, such as a modulated data signal and a carrier.

It should also be noted that the term "including", "comprising", or any other variant thereof is intended to cover a non-exclusive inclusion such that a process, a method, an article, or an apparatus including a series of elements not only includes those elements, but also include other elements that are not explicitly listed, or include elements inherent to such processes, methods, articles, or apparatus. Without more restrictions, elements defined by a statement "including one . . . " do not exclude existence of additional identical elements in the process, the method, the article, or the apparatus that include the elements.

Various embodiments in this specification are described in a progressive manner, same or similar parts among the various embodiments may be referred to each other, and description of each embodiment is mainly focused on difference from the other embodiments. In particular, for an embodiment of a system, description is relatively simple since it is substantially similar to the embodiments of the method. A relevant description of the system embodiment may be obtained by referring to a partial description of the embodiments of the method.

What is claimed is:

1. A method of processing data transmission failure, wherein, the method is executed by a terminal device, the method comprises:
   determining that a target event occurs, wherein the target event comprises at least one of following events: an event that a target Radio Link Control (RLC) entity reaches a maximum number of retransmissions, or an event that a random access procedure of a target SCell fails, the target RLC entity is an RLC entity corresponding to a duplicate bearer in a terminal device, to-be-sent data of the target RLC entity is sent only through one or more SCells, and a target SCell is at least one SCell, in the one or more SCells, for sending the to-be-sent data of the target RLC entity;
   wherein the target SCell is an SCell in a Master Cell Group (MCG), the method further comprises: in a case that the target event occurs, sending information relevant to the target event to a Master Node (MN) corresponding to the MCG through a signaling radio bearer 1 (SRB1) or SRB2; or,
   the target SCell is an SCell in a Secondary Cell Group (SCG), the method further comprises: in a case that the target event occurs, sending information relevant to the target event to a Secondary Node (SN) corresponding to the SCG through a signaling radio bearer 3 (SRB3); or,
   the target SCell is an SCell in a Secondary Cell Group (SCG), the method further comprises: in a case that the target event occurs, sending information relevant to the target event to a Master Node (MN) corresponding to a Master Cell Group (MCG) through a signaling radio bearer 1 (SRB1) or SRB2, wherein, the MN is used to forward the information relevant to the target event to a Secondary Node (SN) corresponding to the SCG;
   wherein the information relevant to the target event comprises at least one of an identifier of a logical channel corresponding to the target RLC entity and an identifier of a cell group to which the target SCell belong.

2. The method according to claim 1, wherein, the method further comprises:
   determining whether to send the information relevant to the target event to a network device in a case that the target event occurs.

3. The method according to claim 1, wherein the method further comprises: performing at least one of following processing operations: resetting the target RLC entity and processing the target SCell;
   wherein, processing the target SCell comprises at least one of following processing operations:
   resetting all RLC entities corresponding to the target SCell;
   deactivating the target SCell;
   stopping uplink signal transmission of the target SCell; and
   stopping downlink signal reception of the target SCell.

4. The method according to claim 1, wherein the method further comprises: processing the duplicate bearer;
   wherein, processing the duplicate bearer comprises at least one of following processing operations:
   deactivating a data duplicate function of a Packet Data Convergence Protocol (PDCP) entity corresponding to the duplicate bearer;
   changing a default transmission path of the duplicate bearer as a transmission path corresponding to an other RLC entity;
   suspending the duplicate hearer, wherein, in a case that the duplicate bearer is suspended, the duplicate bearer does not send or receive data;
   re-establishing a PDCP entity corresponding to the duplicate bearer; and,
   resetting a Media Access Control (MAC) entity corresponding to the duplicate bearer.

5. The method according to claim 4, wherein, before changing the default transmission path of the duplicate bearer as the transmission path corresponding to the other RLC entity, the method further comprises:
   determining that the default transmission path of the duplicate bearer is a transmission path corresponding to the target RLC entity.

6. The method according to claim 4, wherein, before suspending the duplicate bearer, the method further comprises:
   determining that at least one of following events occurs in all RLC entities corresponding to the duplicate bearer: an event that an RLC entity reaches a maximum number of retransmissions, an event that a physical layer of the SCell for sending to-be-sent data of an RLC entity is out of sync, and an event that a random access procedure of the SCell for sending to-be-sent data of an RLC entity fails.

7. The method according to claim 4, wherein, before re-establishing the PDCP entity corresponding to the duplicate bearer, the method further comprises:
   determining that at least one of following events occurs in all RLC entities corresponding to the duplicate bearer: an event that an RLC entity reaches a maximum number of retransmissions, an event that a physical layer of an SCell for sending to-be-sent data of are RLC entity is out of sync, and an event that a random access procedure of an SCell for sending to-be-sent data of an RLC entity fails.

8. The method according to claim 4, wherein, before resetting the MAC entity corresponding to the duplicate bearer, the method further comprises:

determining that at least one of following events occurs in all RLC entities corresponding to the duplicate bearer: an event that an RLC entity reaches a maximum number of retransmissions, an event that a physical layer of an SCell for sending to-be-sent data of an RLC entity is out of sync, and an event that a random access procedure of an SCell for sending to-be-sent data of an RLC entity fails.

9. The method according to claim 2, wherein, determining whether to send the information relevant to the target event to the network device in a case that the target event occurs, comprises:
determining, according to a protocol pre-configured in the terminal device, whether to send the information relevant to the target event to the network device in a case that the target event occurs.

10. The method according to claim 2, wherein, determining whether to send the information relevant to the target event to the network device in a case that the target event occurs, comprises:
receiving configuration information sent by the network device, wherein the configuration information is used to indicate whether to send the information relevant to the target event to the network device in a case that the target event occurs;
determining, based on the configuration information, whether to send the information relevant to the target event to the network device in a case that the target event occurs.

11. The method according to claim 10, wherein, the network device comprises a Master Node (MN) corresponding to a Master Cell Group (MCG), and/or a Secondary Node (SN) corresponding to a Secondary Cat Group (SCG).

12. The method according to claim 2, wherein, the information relevant to the target event further comprises any combination of one or more of the following:
an identifier of the target SCell;
an identifier of a duplicate bearer corresponding to the target RLC entity;
an identifier of a target RLC entity;
an identifier of a logical channel group to which the logical channel corresponding to the target RLC entity belongs;
a measurement result of a cell corresponding to the target RLC entity;
a measurement result of a beam of the cell corresponding to the target RLC entity;
a measurement result of a serving cell;
a measurement result of a beam of the serving cell;
a measurement result of cells of a serving frequency;
a measurement result of beams of cells of a serving frequency;
a measurement result of a serving cell in which a cell group to which the target SCell belongs is;
a measurement result of a beam of a serving cell in which a cell group to which the target SCell belongs is;
a measurement result of a cell corresponding to a serving frequency to which the target SCell belongs;
a measurement result of a beam of a cell corresponding to a serving frequency to which the target SCell belongs;
a measurement result of a cell corresponding to a non-serving frequency; and,
a measurement result of a beam of a cell corresponding to a non-serving frequency.

13. An electronic device, wherein, the electronic device comprises:
a processor; and
a storage storing a computer executable instruction, wherein in a case that the computer executable instruction is executed by a processor, the processor is caused to perform following steps:
determining that a target event occurs, wherein the target event comprises at least one of following events: an event that a target Radio Link Control (RLC) entity reaches a maximum number of retransmissions, or an event that a random access procedure of a target SCell fails, the target RLC entity is an RLC entity corresponding to a duplicate bearer in the electronic device, to-be-sent data of the target RLC entity is sent only through one or more SCells, and a target SCell is at least one SCell, in the one or more SCells, for sending the to-be-sent data of the target RLC entity;
wherein the target SCell is an SCell in a Master Cell Group (MCG), the method further comprises: in a case that the target event occurs, sending information relevant to the target event to a Master Node (MN) corresponding to the MCG through a signaling radio bearer 1 (SRB1) or SRB2; or,
the target SCell is an SCell in a Secondary Cell Group (SCG), the method further comprises: in a case that the target event occurs, sending information relevant to the target event to a Secondary Node (SN) corresponding to the SCG through a signaling radio bearer 3 (SRB3); or,
the target SCell is an SCell in a Secondary Cell Group (SCG), the method further comprises: in a case that the target event occurs, sending information relevant to the target event to a Master Node (MN) corresponding to a Master Cell Group (MCG) through a signaling radio bearer 1 (SRB1) or SRB2, wherein, the MN is used to forward the information relevant to the target event to a Secondary Node (SN) corresponding to the SCG;
wherein the information relevant to the target event comprises at least one of an identifier of a logical channel corresponding to the target RLC entity and an identifier of a cell group to which the target SCell belong.

14. The electronic device according to claim 13, wherein, in a case that the computer executable instruction is executed by the processor, the processor is caused to further perform:
determining whether to send the information relevant to the target event to a network device in a case that the target event occurs.

15. The electronic device according to claim 13, wherein the processor is caused to perform following step: performing at least one of following processing operations: resetting the target RLC entity and processing the target SCell;
wherein, processing the target SCell comprises at least one of following processing operations:
resetting all RLC entities corresponding to the target SCell;
deactivating the target SCell;
stopping uplink signal transmission of the target SCell; and
stopping downlink signal reception of the target SCell.

16. The electronic device according to claim 13, wherein the processor is caused to perform following step: processing the duplicate bearer;
wherein, processing the duplicate bearer comprises at least one of following processing operations:
deactivating a data duplicate function of a Packet Data Convergence Protocol (PDCP) entity corresponding to the duplicate bearer;

changing a default transmission path of the duplicate bearer as a transmission path corresponding to an other RLC entity;

suspending the duplicate bearer, wherein, in a case that the duplicate bearer is suspended, the duplicate bearer does not send or receive data;

re-establishing a PDCP entity corresponding to the duplicate bearer; and, resetting a Media Access Control (MAC) entity corresponding to the diplicate bearer.

17. The electronic device according to claim 14, wherein, the information relevant to the target event further comprises any combination of one or more of the following:

an identifier of the target SCell;

an identifier of a duplicate bearer corresponding to the target RLC entity;

an identifier of a target RLC entity;

an identifier of a logical channel group to which the logical channel corresponding to the target RIC entity belongs;

a measurement result of a cell corresponding to the target RLC entity;

a measurement result of a beam of the cell corresponding to the target RLC entity;

a measurement result of a serving cell;

a measurement result of a beam of the serving cell;

a measurement result of cells of a serving frequency;

a measurement result of beams of cells of a serving frequency;

a measurement result of a serving cell in which a cell group to which the target SCell belongs is;

a measurement result of a beam of a serving cell in which a cell group to which the target SCell belongs is;

a measurement result of a cell corresponding to a serving frequency to which the target SCell belongs;

a measurement result of a beam of a cell corresponding to a serving frequency to which the target SCell belongs;

a measurement result of a cell corresponding to a non-serving frequency; and, a measurement result of a beam of a cell corresponding to a non-serving frequency.

18. A non-transitory computer readable storage medium, wherein, the non-transitory computer readable storage medium stores one or more programs, wherein in a case that the one or more programs are executed by an electronic device comprising a plurality of application programs, the electronic device is caused to perform following steps:

determining that a target event occurs, wherein the target event comprises at least one of following events: an event that a target Radio Link Control (RLC) entity reaches a maximum number of retransmissions, or an event that a random access procedure of the a target SCell fails, the target RLC entity is an RLC entity corresponding to a duplicate bearer in a terminal device, to-be-sent data of the target RLC entity is sent only through one or more SCells, and a target SCell is at least one SCell, in the one or more SCells, for sending the to-be-sent data of the target RLC entity;

wherein the target SCell is an SCell in a Master Cell Group (MCG), the method further comprises: in a case that the target event occurs, sending information relevant to the target event to a Master Node (MN) corresponding to the MCG through a signaling radio bearer 1 (SRB1) or SRB2; or, the target SCell is an SCell in a Secondary Cell Group (SCG), the method further comprises: in a case that the target event occurs, sending information relevant to the target event to a Secondary Node (SN) corresponding to the SCG through a signaling radio bearer 3 (SRB3); or, the target SCell is an SCell in a Secondary Cell Group (SCG), the method further comprises: in a case that the target event occurs, sending information relevant to the target event to a Master Node (MN) corresponding to a Master Cell Group (MCG) through a signaling radio bearer 1 (SRB1) or SRB2, wherein, the MN is used to forward the information relevant to the target event to a Secondary Node (SN) corresponding to the SCG;

wherein the information relevant to the target event comprises at least one of an identifier of a logical channel corresponding to the target RLC entity and an identifier of a cell group to which the target SCell belong.

* * * * *